(12) United States Patent
Kirchner et al.

(10) Patent No.: US 8,175,755 B2
(45) Date of Patent: May 8, 2012

(54) SYSTEMS AND METHODS FOR MONITORING POWER DEVICES

(75) Inventors: Andreas Kirchner, Osnabrueck (DE); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 12/620,885

(22) Filed: Nov. 18, 2009

(65) Prior Publication Data
US 2011/0118883 A1    May 19, 2011

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 1/00 | (2006.01) |
| H02J 3/00 | (2006.01) |
| F03D 9/00 | (2006.01) |
| H02P 9/04 | (2006.01) |

(52) U.S. Cl. .......... 700/293; 700/295; 700/298; 307/85; 290/44

(58) Field of Classification Search ................... 700/286, 700/287, 291–293, 295, 297, 298; 307/85–87; 290/43, 44
See application file for complete search history.

(56) References Cited

U.S. PATENT DOCUMENTS

| | | | | |
|---|---|---|---|---|
| 4,245,150 | A * | 1/1981 | Driscoll et al. .................. 377/32 |
| 7,834,472 | B2 * | 11/2010 | Rebsdorf et al. ................ 290/44 |
| 7,915,762 | B2 * | 3/2011 | Helle et al. ....................... 307/87 |
| 7,930,070 | B2 * | 4/2011 | Imes ............................ 700/291 |
| 2009/0160187 | A1 * | 6/2009 | Scholte-Wassink ............ 290/44 |
| 2009/0206603 | A1 * | 8/2009 | Llorente Gonzalez ......... 290/44 |
| 2009/0304101 | A1 * | 12/2009 | LoPorto et al. ............... 375/260 |
| 2010/0114395 | A1 * | 5/2010 | Hinatsu et al. ................ 700/295 |
| 2010/0145542 | A1 * | 6/2010 | Chapel et al. ................. 700/295 |

* cited by examiner

*Primary Examiner* — Crystal J Barnes-Bullock
(74) *Attorney, Agent, or Firm* — Sutherland Asbill & Brennan LLP

(57) ABSTRACT

Systems and methods for monitoring power devices that are connecting in a loop to a main power line are provided. A plurality of power devices that are connected in a loop to a power grid line may be provided. The loop may include a plurality of power lines. A disturbance within the plurality of power devices may be identified, and an impact of the identified disturbance on the plurality of power lines may be determined. A power output of one or more of the plurality of power devices may be adjusted based at least in part on the determined impact.

20 Claims, 2 Drawing Sheets

SYSTEMS AND METHODS FOR MONITORING POWER DEVICES

FIELD OF THE INVENTION

Embodiments of the invention relate generally to power devices and more specifically to systems and methods for monitoring power devices that are connected in a loop to a main power line.

BACKGROUND OF THE INVENTION

Power devices, such as wind turbines, photovoltaic cells, gas turbines, steam turbines, other power generating devices, transformers, other power transmission devices, etc. are utilized in a wide variety of applications for power production and/or transmission. Power devices are often connected to a main power line or a power grid using suitable connecting power lines. Typically, individual connecting power lines are provided for each power device included at a power plant or power station. However, as the number of power devices within a power plant increases, individually connecting the power devices may require a relatively large number of connecting power lines. Accordingly, a need exists for improved methods for connecting power devices to a main power line.

In certain circumstances, a plurality of power devices may be connected to a main power line in a loop. The use of a loop may reduce the number and/or rating of connecting power lines that are utilized in the system. However, in the event of a disturbance within the power devices, an open condition may occur in the loop. In certain circumstances, the open condition may lead to unsafe conditions within the connecting power lines included in the loop, such as an overpowering of a connecting power line.

Therefore, a need exists for systems and methods for monitoring power devices that are connected in a loop to a main power line.

BRIEF DESCRIPTION OF THE INVENTION

Some or all of the above needs and/or problems may be addressed by certain embodiments of the invention. Embodiments of the invention may include systems and methods for interfacing a renewable power source to a power grid. According to one embodiment of the invention, there is disclosed a method for monitoring power devices that are connecting in a loop to a main power line. A plurality of power devices that are connected in a loop to a power grid line may be provided. The loop may include a plurality of power lines. A disturbance within the plurality of power devices may be identified, and an impact of the identified disturbance on the plurality of power lines may be determined. A power output of one or more of the plurality of power devices may be adjusted based at least in part on the determined impact.

According to another embodiment of the invention, there is disclosed a system for monitoring power devices that are connected in a loop to a main power line. The system may include a plurality of power devices, a plurality of power lines, and at least one controller. The plurality of power lines may be operable to connect the power devices to a power grid line. The at least one controller may be operable to identify a disturbance within the plurality of power devices and to determine an impact of the identified disturbance on the plurality of power lines. The at least one controller may be further operable to adjust, based at least in part on the determined impact, a power output of one or more of the plurality of power devices.

According to another embodiment of the invention, there is disclosed a system for monitoring the output of a power device. The system may include a power device, one or more connections, at least one circuit breaker, and at least one controller. The one or more connections may be operable to connect the power device to a loop, and the loop may include a plurality of power lines operable to connect a plurality of power devices, including the power device, to a main power line. The at least one circuit breaker may be operable to control the transmission of power through the one or more connections. The at least one controller may be operable to identify an open condition within the at least one circuit breaker and to determine an impact of the identified condition on the plurality of power lines. The at least one controller may be further operable to adjust, based at least in part on the determined impact, a power output of the power device.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
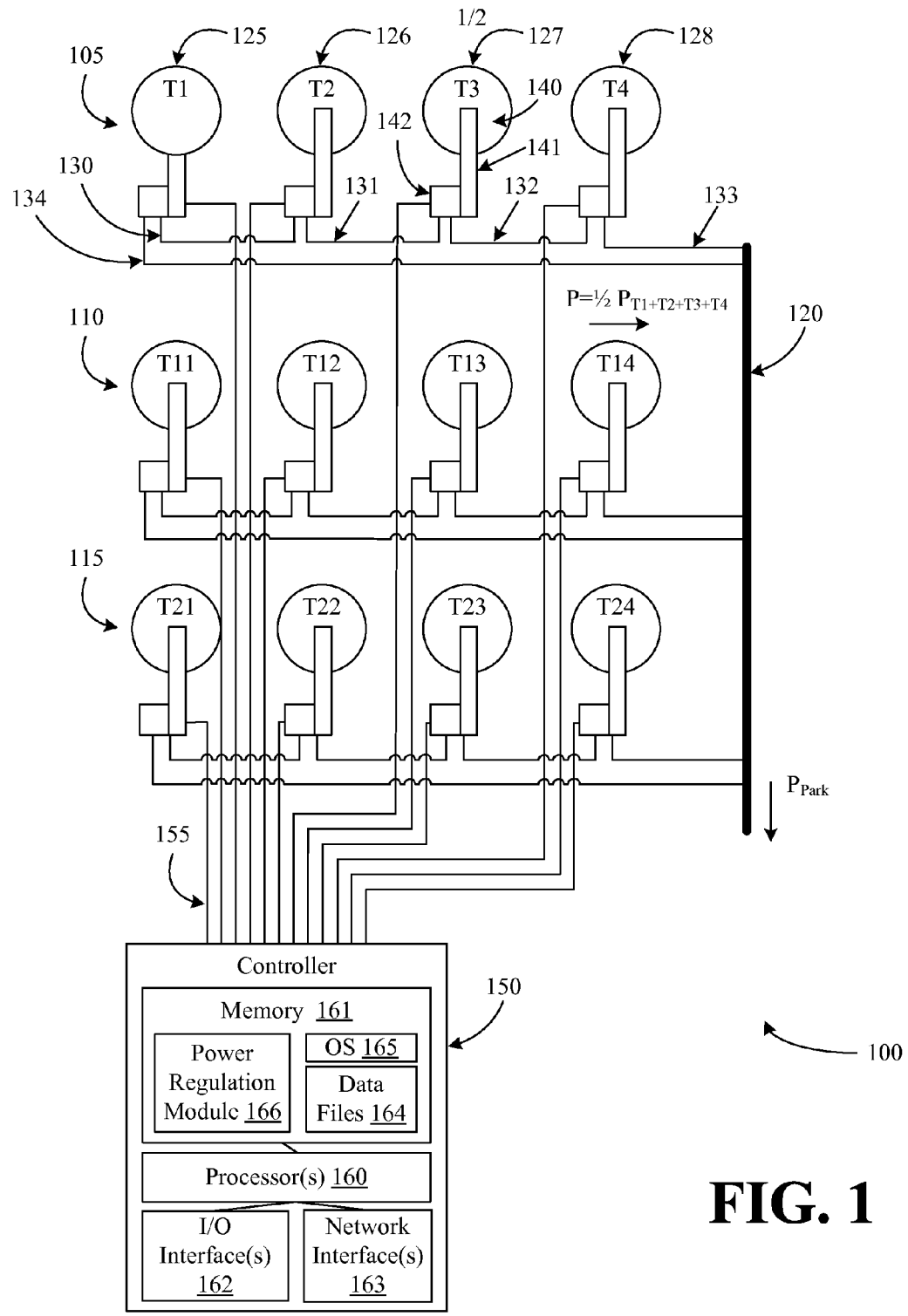

Having thus described the invention in general terms, reference will now be made to the accompanying drawings, which are not necessarily drawn to scale, and wherein:

FIG. 1 is a schematic diagram of one example system for monitoring power devices, according to an illustrative embodiment of the invention.

Figure 2:
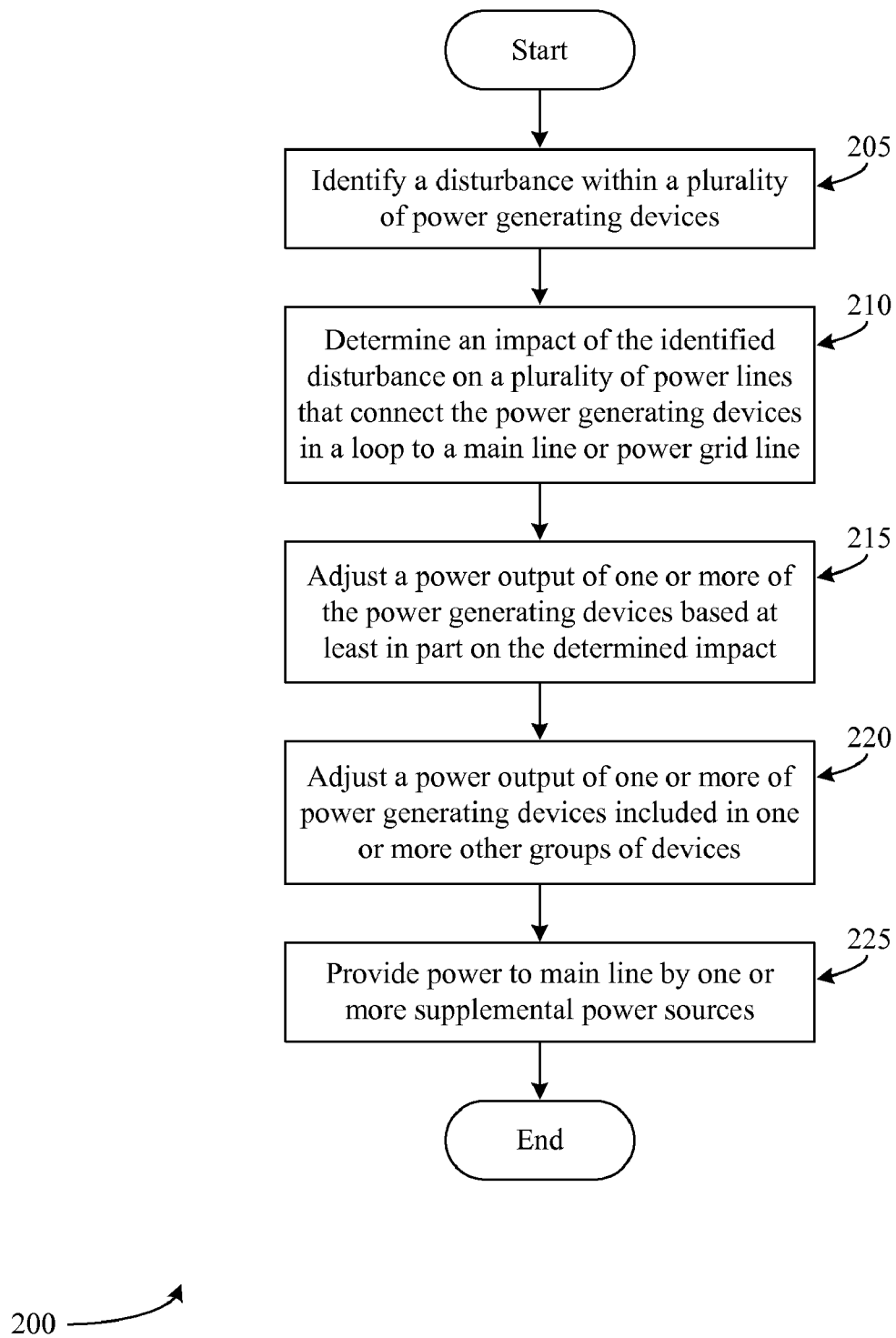

FIG. 2 is a flow chart of one example method for monitoring power devices, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "power device" may refer to any suitable device, system, method, and/or combination of devices and/or systems and/or methods that are operable to generate power and/or transmit power. Power devices may include power generating devices and/or power transmission devices. Examples of power generating devices include renewable power sources, such as wind turbines, photovoltaic cells, and photovoltaic arrays, as well as other power sources, such as gas turbines, steam turbines, etc. Examples of power transmission devices include transformers and other suitable transmission devices. For purposes of this disclosure, the terms "power device," "power generating device," and "power transmission device" be utilized interchangeably.

For purposes of this disclosure, the term "main power line" may refer to a power line associated with a power plant, a power farm, a turbine farm, or a power grid. By connecting to a main power line, a power device may be connected to a power grid or to a main power plant line that is connected to a power grid. In this regard, power generated by or otherwise provided by a power device may be supplied to the power grid. Additionally, the terms "main power line," "grid line," "power grid line," and "power grid" may be utilized interchangeably.

For purposes of this disclosure, the term "disturbance" may refer to any event that affects the power output of one or more power devices connecting in a loop to a main power line and/or any event that affects the communication or transmission of power onto or through one or more connecting power line that connect the power devices in a loop. Examples of disturbances include, but are not limited to, a power surge, an open connection between a power device and a connecting power line, a tripped or opened circuit breaker associated with a power device, etc.

For purposes of this disclosure, the term "impact" may refer to an effect that an identified disturbance has on one or more connecting power lines that are utilized to connect power devices in a loop to a main power line. The impact of a disturbance may be determined based at least in part on the type of disturbance and/or the location of the identified disturbance. Additionally, the determination of an impact may take the specifications of the connecting power lines into consideration. For example, a tripped circuit breaker type of disturbance may be identified, leading to an open condition within a loop of connecting power lines. An impact of the open condition on the amplitude of the power signals that are transmitted through the one or more connecting power lines may be determined.

Disclosed are systems and methods for monitoring power devices, such as wind turbines, photovoltaic cells, gas turbines, steam turbines, transformers, etc., that are connecting in a loop to a main power line or power grid. A plurality of power devices may be connected in a loop to a main power line. By connecting the power devices to the main power line in a loop, the number and/or rating of the cables and/or power lines required for the connections may be reduced. Additionally, when a loop is utilized, the power devices may be monitored for any situations that may lead to overpowering of any of the cables of the loop. In various embodiments of the invention, a disturbance within the plurality of power devices may be identified, and an impact of the identified disturbance on the cables of the loop may be determined. A power output of one or more of the plurality of power devices may then be adjusted based at least in part on the determined impact. In this regard, relatively safe conditions within the loop may be maintained.

Various embodiments of the invention may include one or more special purpose computers, systems, and/or particular machines that facilitate the monitoring of power devices and/or the adjustment of the power output of power devices. A special purpose computer or particular machine may include a wide variety of different software modules as desired in various embodiments. As explained in greater detail below, in certain embodiments, these various software components may be utilized to monitor power devices and/or to control the operations of the power devices.

Certain embodiments of the invention described herein may have the technical effect of monitoring the output of power devices supplied to power lines or cables that connect the power devices in a loop to a main power line. Certain embodiments of the invention may further have the technical effect of identifying potential overpowering conditions of the power lines or cables and adjusting the power output of one or more power devices to maintain desirable conditions within the power lines or cables.

FIG. 1 is a block diagram of one example system 100 for monitoring power devices, according to an illustrative embodiment of the invention. The system 100 illustrated in FIG. 1 includes a plurality of wind turbines, as described in greater detail below. However, various embodiments of the invention may equally be applicable to other types of power devices, for example, photovoltaic cells, photovoltaic arrays, gas turbines, steam turbines, transformers, etc.

With reference to FIG. 1, the system 100 may include one or more groups 105, 110, 115 of wind turbines. Each group 105, 110, 115 of wind turbines may be connected in a loop to a main power line 120 or to a power grid. Any number of groups of wind turbines may be utilized as desired in various embodiments of the invention. Additionally, each group 105, 110, 115 may include any number of wind turbines. The components of a first group 105 of wind turbines will now be described in greater detail. The components of other groups 110, 115 of turbines may be similar to the components of the first group 105 of turbines. For purposes of describing the first group 105 of wind turbines, the first group 105 may be referred to as a group 105 of turbines.

The group 105 of turbines may include any number of wind turbines and/or other power devices as desired in various embodiments of the invention. As shown in FIG. 1, the group 105 may include four wind turbines 125, 126, 127, 128 that are connected in a loop to the main power line 120. A plurality of connecting power lines may be utilized to connect the turbines 125, 126, 127, 128 in a loop. As shown, a first power line 130 may connect the first turbine 125 to the second turbine 126; a second power line 131 may connect the second turbine 126 to the third turbine 127; a third power line 132 may connect the third turbine 127 to the fourth turbine 128; a fourth power line 133 may connect the fourth turbine 128 to the main power line 120; and a fifth power line 134 may connect the first turbine 125 to the main power line 120. In this regard, a loop may be formed.

As a result of connecting the turbines 125, 126, 127, 128 in a loop to the main power line 120, cost savings and other efficiencies may be achieved with respect to the cables or power lines that are utilized to connect the turbines 125, 126, 127, 128 to the main power line 120. For example, the number of cables and total length of cable required to connect the turbines 125, 126, 127, 128 to the main power line 120 may be significantly less than that required to individually connect the turbines to the main power line 120.

By providing power produced by multiple turbines to the main power line 120, the number of cables and total length of cable required may be reduced. However, the diameter of the cables that are utilized may be greater than that required for individually connecting a turbine to the main power line 120. In other words, the diameter of a connecting cable may be such that it will support a power signal that is greater than that produced by a single turbine of the group 105. By connecting the turbines 125, 126, 127, 128 to the main power line 120 in a loop, the diameters of the connecting power lines 130, 131, 132, 133, 134 may be reduced from that required to support the maximum power output of all of the turbines 125, 126, 127, 128 in the group 105. For example, the diameters of the connecting power lines 130, 131, 132, 133, 134 may be reduced to a cable diameter intended to transmit approximately one half of the total maximum power generated by the turbines 125, 126, 127, 128 included in the group 105. Due to the presence of the loop, half of the power generated by the turbines 125, 126, 127, 128 will be transmitted to the main power line 120 via the fourth connecting power line 133 and the other half of the power generated by the turbines 125, 126, 127, 128 will be transmitted to the main power line 120 via the fifth connecting power line 134.

In various embodiments of the invention, the use of a loop to connect power devices to a main power line 120 may provide a scalable system that allows a greater number of power devices to be connected to the main power line 120. For example, an infrastructure of existing connecting power lines may be utilized to connect a greater number of power devices to the main power line 120 than that which can be connected without a loop. In this regard, a power plant or turbine farm may be easily extended to include a greater number of power devices. Additionally, the use of a loop may provide for easier repowering of the turbines. For example, before repowering, two turbines 127, 128 may be connected in series or in a string to the main power line 120 utilizing two connecting power lines 132, 133 that have a capacity of two times the turbine maximum power. If two new turbines 125, 126 are added in series to the existing turbines 127, 128 utilizing two additional connecting power lines 130, 131, then the existing connecting power lines 132, 133 and circuit breakers of the existing turbines 127, 128 may not be able to handle the total power output of the four turbines 125, 126, 127, 128 upon a repowering event. However, by adding one additional connecting power line 134 that also has a capacity or maximum power rating of two times the turbine maximum power, the two additional turbines 125, 126 may be added without changing the existing infrastructure.

With continued reference to FIG. 1, the other illustrated groups 110, 115 of power devices may include similar components to those described above with reference to the first group 105. Additionally, each of the wind turbines included in the various groups may have similar components. Each turbine, such as the third turbine 127 illustrated in the first group 105, may include a plurality of blades 140 rotatably attached to a tower 141 or other mounting. The plurality of blades 140 may rotate as a result of wind contacting the blades 140, thereby powering a generator that is operable to output an electrical power signal. The electrical power signal may be transmitted onto the connecting power lines 131, 132 by one or more suitable connections included in an interface component 142. The interface component 142 may further include various switches, transformers, and/or safety devices, such as circuit breakers that control the flow of an electrical power signal on the connecting power lines 131, 132. In this regard, if a disturbance, power surge, or other problem is identified in the turbine 127 or in association with the turbine, then the transmission of a power signal from turbine 127 onto one or more of the connecting power lines 131, 132 may be disrupted. Additionally, in certain embodiments, the turbine 127 may include one or more controllers or control devices, for example, application specific circuits, microcontrollers, minicomputers, personal computers, servers, and the like. As desired, these controllers or control devices may monitor and/or control the operations of the turbine 127. The controllers may further facilitate communications between the turbine 127 and a central controller 150 and/or other turbines, such as other turbines 125, 126, 128 included in the group 105.

The main power line 120 may be operable to receive a power signal from one or more groups 105, 110, 115 of turbines associated with the system 100. Additionally the main power line 120 may be incorporated into or connected to a power grid, which may be any suitable electrical network or combination of electrical networks that facilitates electrical power transmission and/or distribution. Any number of power devices may be utilized as desired to supply power to the power grid. In certain embodiments, attempts may be made to maintain the power grid at a relatively constant frequency or within a range of acceptable frequencies, for example, approximately 50 Hertz to approximately 60 Hertz. Transient events, such as a fluctuation in the output of one or more power devices or power generating systems, may affect the frequency and stability of the power grid. As explained in greater detail below, embodiments of the invention may be operable to monitor and/or control the output of power devices connected to the main power line 120 in order to maintain stability within the power grid.

The system 100 may further include at least one central controller 150 or control system, hereinafter referred to as a controller 150. The controller 150 may be operable to monitor and/or control the operations of one or more wind turbines and/or power devices associated with the system 100. The controller 150 may further be operable to identify disturbances or other conditions within the power devices and to determine an impact that a disturbance might have on the connecting power lines that connect the power devices to the main power line 120. As shown in FIG. 1, a plurality of connections 155 may facilitate communications between the controller 150 and the various turbines and/or power devices included in the system. A wide variety of suitable connections may be utilized to facilitate communication, for example, direct network connections, local area network connections, wide area network connections, Internet connections, Bluetooth enabled connections, radio frequency network connections, cellular network connections, any suitable wired connections, any suitable wireless connections, and/or any suitable combinations of connections.

With continued reference to FIG. 1, the controller 150 may be a suitable processor driven device that is capable of monitoring and/or controlling the power devices and/or other components of the system 100. Examples of suitable controllers include, but are not limited to, application specific circuits, microcontrollers, minicomputers, personal computers, servers, and the like. In certain embodiments the controller 150 may be or may be incorporated into a supervisory command and data acquisition (SCADA) system associated with a power source or power plant. The controller 150 may include any number of processors 160 that facilitate the execution of computer-readable instructions to control the operations of the controller 150. By executing computer-readable instructions associated with monitoring and/or controlling power devices, the controller 150 may form a special purpose computer that controls the supply of power from one or more groups 105, 110, 115 of power devices to a main power line 120 or power grid.

In addition to one or more processor(s) 140 the controller 150 may include one or more memory devices 141, one or more input/output ("I/O") interfaces 142, and one or more network interfaces 143. The one or more memory devices 141 or memories may be any suitable memory devices for example, caches, read only memory devices, random access memory devices, magnetic storage devices, etc. The one or more memory devices 141 may store data, executable instructions, and/or various program modules utilized by the controller 150, for example, data files 164, an operating system 165, and/or a power regulation module 166 or power regulation application. The data files 164 may include stored data associated with the operation of the power devices included in the system 100, stored data associated with the connecting power lines, stored data associated with one or more identified disturbances or other conditions, stored data associated with containment levels for the power devices, and/or stored data associated with other power devices and/or systems that are connected to the power grid.

In certain embodiments of the invention, the controller 150 may include any number of software applications that are executed to facilitate the operations of the controller 150. The software applications may include computer-readable instructions that are executable by the one or more processors 140. The execution of the computer-readable instructions may form a special purpose computer that facilitates the monitoring and or control of the power devices associated with the system 100. As an example of a software application, the controller 150 may include an operating system ("OS") 165 that controls the general operation of the controller 150 and that facilitates the execution of additional software applications. The controller 150 may also include a power regulation module 165 or power regulation application that is operable to monitor and/or adjust the power output of the power devices associated with the system 100.

In various embodiments of the invention, the power regulation module 165 may monitor and/or control the power output of the turbines or other power devices that are supplied to connecting power lines for transmission to the main power line. For example, the power regulation module 165 may monitor and/or control the power output of the turbines 125, 126, 127, 128 included in the first group 105 of turbines. The other groups 110, 115 of turbines may be monitored and/or controlled in a similar manner. The power regulation module 165 may monitor the turbines 125, 126, 127, 128 in real time or near real time and measure and/or determine an amount of power that is supplied to each of the connecting power lines 130, 131, 132, 133, 134. In this regard, the power regulation module 165 may identify situations in which the power capacity of a connecting power line has been exceeded, and the power regulation module 165 may adjust the output of one or more of the turbines 125, 126, 127, 128 included in the group 105 in order to maintain acceptable conditions within the connecting power line.

In the event of a disturbance within the loop that is utilized to connect the group 105 of turbines to the main power line 120, an amount of power supplied to a connecting power line may exceed the capacity of the connecting power line. For example, with reference to FIG. 1, the connecting power lines 130, 131, 132, 133, 134 may be dimensioned to have a cable diameter sufficient to carry approximately one half of the total power generated by the turbines 125, 126, 127, 128 of the group 105. During the normal operation of the turbines 125, 126, 127, 128 of the group 105, the total power produced by the turbines will be approximately evenly distributed between the top portion of the loop and the bottom portion of the loop. In the event of a disturbance, such as the tripping of a circuit breaker that connects the third turbine 127 to the third connecting power line 132, a potential overpowering of one or more of the connecting power lines may occur. The tripping of the circuit breaker may result in an open condition within the loop between the third turbine 127 and the fourth turbine 128. As a result, the power provided to the fourth connecting power line 133 may be reduced to the power output by the fourth turbine 128. Additionally, the power provided to the remaining connecting power lines may be increased to the power output by the remaining turbines 125, 126, 127. This power output may exceed the capacity of the remaining connecting power lines.

As another example, if a disturbance, such as a tripped circuit breaker, opens a connection between the first turbine 125 and the fifth connecting power line 134, the power supplied to the fifth connecting power line 134 may be reduced to approximately zero power. Additionally, the power provided to the remaining connecting power lines may be increased to the power output by all of the turbines 125, 126, 127, 128 of the group, which may exceed the capacity of the remaining connecting power lines.

According to an aspect of the invention, the power regulation module 165 may be operable to identify one or more disturbances or other adverse conditions within a group 105 of turbines 125, 126, 127, 128 that may affect the power provided to one or more connecting power lines 130, 131, 132, 133, 134. A wide variety of different types of disturbances may be identified as desired in various embodiments of the invention, such as the tripping of a circuit breaker that controls the connection a turbine to a connecting power line, the disconnection of a turbine from a connecting power line, an open condition (e.g., severing) of a connecting power line, etc. In addition to identifying a disturbance, the power regulation module 165 may be operable to determine a location of the identified disturbance. For example, the power regulation module 165 may be operable to determine a circuit breaker that has tripped via suitable communications between the controller 150 and the turbines, such as communications facilitated by the plurality of connections 155.

Once a disturbance and/or a location of the disturbance has been identified, the power regulation module 165 may determine an impact of the disturbance on one or more of the connecting power lines utilized to connect the group 105 of turbines in a loop to the main power line 120. For example, the power regulation module 165 may determine an approximate power that is supplied to one or more of the connecting power lines in light of the identified disturbance. The power regulation module 165 may then determine whether the approximate power that is supplied to one or more of the connecting power lines exceeds one or more specifications of the connecting power lines, such as a maximum power rating or capacity of the connecting power lines. If it is determined that the approximate power that is supplied to one or more of the connecting power lines exceeds one or more specifications, then the power regulation module 165 may reduce the power output of one or more of the turbines 125, 126, 127, 128 of the group 105 in order to maintain the power supplied to the connecting power lines at an acceptable level. Using the example above of a disturbance that leads to an opening in the connection between the third turbine 127 and the third connecting power line 132, the power regulation module 165 may direct one or more of the first turbine 125, second turbine 126, and third turbine 127 to reduce their power output in order to limit the amount of power supplied to the first 130, second 131, and fifth 134 connecting power line.

Additionally, the power regulation module 165 may monitor the total power that is supplied to the main power line 120 and/or the power grid. In order to compensate for losses in power due to reducing the output of certain turbines, the power output of other turbines in the system 100 may be increased. In this regard, relatively stable conditions may be maintained in the power grid. In other words, the total power supplied to the power grid may be maintained at a relatively constant level such that the frequency of the power grid does not fall outside of an acceptable range of frequencies. Using the example of the previous paragraph in which the output of one or more of the first 125, second 126, and third 127 turbines is reduced, the power regulation module 165 may direct the supply of additional power to the main power line 120 or power grid to compensate for the reduction in power. For example, the power regulation module 165 may direct the fourth turbine 128 to increase the amount of power that it supplied to the main power line 120. Because the fourth connecting power line 133 is capable of carrying approximately one half of the maximum total power produced by all four turbines in the group 105, the fourth connecting power line 133 is capable of carrying the maximum amount of power that may be produced by the fourth turbine 128. As another example, the power regulation module 165 may direct one or more turbines included in other groups of turbines, such as the second group 110 or third group 115 illustrated in FIG. 1, to increase the amount of power that is supplied to the main power line 120 or power grid. As yet another example, the power regulation module 165 may direct one or more supplemental power devices or power sources, such as a peaker gas turbine, to supply supplemental power to the power grid to compensate for the reduction in power. In this regard, relatively stable conditions may be maintained within the power grid.

As desired in various embodiments of the invention, a containment level may be applied to one or more of the turbines 125, 126, 127, 128 in the group 105 of turbines and/or to turbines in other groups. The containment level may limit the amount of power that is output by the turbines. A wide variety of containment levels may be utilized as desired. For example, a containment level of approximately seventy-five percent of the maximum output may be applied to one or more of the turbines. By utilizing a containment level, flexibility may be provided in the ability to adjust the power output of turbines included in the system 100. For example, if a turbine is not operating at a maximum output due to a containment level, then the output of the turbine may be increased to a level higher than the containment level in order compensate for a reduction in power output of one or more other turbines.

The one or more I/O interfaces 162 may facilitate communication between the controller 150 and one or more input/output devices, for example, a universal serial bus port, a serial port, a disk drive, a CD-ROM drive, and/or one or more user interface devices, such as, a display, keyboard, keypad, mouse, control panel, touch screen display, microphone, etc. that facilitate user interaction with the controller 150. The one or more I/O interfaces 162 may be utilized to receive or collect data and/or user instructions from a wide variety of input devices. Received data may be processed by the power regulation module 166 as desired in various embodiments of the invention and/or stored in the one or more memory devices 161.

The one or more network interfaces 163 may facilitate connection of the controller 150 to one or more suitable networks and/or connections, for example, the connections 155 that facilitate communications with the power devices. In this regard, the controller 150 may receive data from one or more of the power devices and/or communicate data and/or commands to one or more of the power devices. The one or more network interfaces 163 may further facilitate connection of the controller 150 to one or more suitable networks, for example, a local area network, a wide area network, the Internet, a cellular network, a radio frequency network, a Bluetooth enabled network, a Wi-Fi enabled network, a satellite-based network, any wired network, any wireless network, etc for communication with external devices and/or systems.

In addition to or as an alternative to a central controller 150 monitoring and/or controlling the power devices, certain embodiments of invention may include control units or controllers that are associated with each of the turbines included in the system. For example, a separate control unit may be associated with each of the turbines 125, 126, 127, 128 included in the first group 105 of turbines. Each control unit may monitor the output of a respective turbine and the connections of that turbine to the connecting power lines. Additionally, each control unit may be in communication with the control units of one or more other turbines included within the group 105 and/or included in other groups. As desired, each control unit may be in communication with a central controller 150 and/or with one or more supplemental power devices.

Certain components of a control unit associated with a turbine may be similar to those described above with respect to the central controller 150. For example, a control unit may be a suitable processor-driven device that includes a power regulation module similar to the power regulation module 166 described above. The power regulation module of the control unit may be operable to identify a disturbance in a connection to the connecting power lines and to determine and impact of the disturbance on the connecting power lines. Based at least in part on the determined impact, the power regulation module 166 may adjust the power of its associated turbine. Additionally, the control unit may communicate information associated with the identified disturbance and/or determined impact to one or more other control units associated with other turbines. These other control units may similar adjust the output of their associated turbines. Alternatively, the control unit may direct other turbines to adjust their power output As desired, the control unit may also direct supplemental power devices to provide power to the main power line 120 or power grid.

As desired, embodiments of the invention may include a system 100 with more or less than the components illustrated in FIG. 1. The system 100 of FIG. 1 is provided by way of example only.

FIG. 2 is a flowchart illustrating one example method 200 for monitoring power devices, according to an illustrative embodiment of the invention. The method may be utilized in association with one or more power systems, such as the system 100 illustrated in FIG. 1. In other words, the method 200 may be utilized to monitor a group or plurality of power devices, such as the first group 105 illustrated in FIG. 1, that are connecting in a loop to a main power line or power grid, such as the main power line 120 illustrated in FIG. 1.

The method 200 may begin at block 205. At block 205, a disturbance within the group 105 or plurality of power devices may be identified. A wide variety of different types of disturbances may be identified as desired in various embodiments of the invention, for example, the tripping or opening of a circuit breaker that connects a power device to a connecting power line that forms a portion of the loop, an over current event in one or more of the connecting power lines in the loop, or an excessive temperature event in one or more of the connecting power lines in the loop.

Once a disturbance has been identified at block 205, operations may continue at block 210. At block 210, an impact of the identified disturbance on the plurality of power lines that connect the power devices in a loop to the main power line 120, such as the connecting power lines 130, 131, 132, 133, 134 illustrated in FIG. 1, may be determined. For example, the approximate power that is supplied to each of the connecting power lines as a result of the identified disturbance may be determined. Determinations may then be made as to whether the approximate power supplied to each power line exceeds one or more respective specifications of the power lines, such as a respective power rating or power capacity of the power lines.

At block 215, the power output of one or more of the power devices may be adjusted based at least in part on the determined impact on the connecting power lines. As desired, the power output of one or more power devices may be decreased to limit the power that is supplied to one or more connecting power lines. Additionally, in certain embodiments, the power output of one or more power devices may be increased in order to compensate for a loss in power by other devices and to assist in maintaining a desired power output by the group 105 of turbines. In certain circumstances, the maintenance of a desired power output may assist in maintaining relatively stable conditions within a power grid that is supplied by the power devices.

At block 220, which may be optional in certain embodiments of the invention, the power output of one or more power devices included in one or more other groups of devices, such as the second group 110 and third group 115 illustrated in FIG. 1, may be adjusted. For example, the output of one or more power devices included in one or more other groups may be increased to assist in maintaining a desired power output that is supplied to the main power line 120 or power grid. In this regard, relatively stable conditions may be maintained in the power grid notwithstanding a reduction or loss in power from one or more turbines 125, 126, 127, 128 included in the first group 105.

At block 225, which may be optional in certain embodiments of the invention, at least a portion of the power lost as a result of reducing the power output of one or more turbines 125, 126, 127, 128 included in the first group 105 may be supplemented by utilizing one or more supplemental power sources or supplemental power devices. A wide variety of different supplemental power sources may be utilized as desired in various embodiments of the invention. Examples include any suitable power device or power generating system operable to produce power that is supplied to the main power line 120 or power grid, such as, gas turbines, steam turbines, photovoltaic cells or arrays and their associated inverters, wind turbines, etc. In certain embodiments, a peaker device, peaker turbine, or peaker may be utilized to supply power to the power grid in a relatively rapid manner to compensate for the loss in output. A peaker may be a device that can be ramped up relatively quickly to begin generating power.

The method 200 may end following block 225.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for monitoring power devices, the method comprising:
   providing a plurality of power devices that are connected in a loop to a power grid line, the loop comprising a plurality of power lines;
   identifying a disturbance within the plurality of power devices;
   determining an impact of the identified disturbance on the plurality of power lines; and
   adjusting, based at least in part on the determined impact, a power output of one or more of the plurality of power devices.

2. The method of claim 1, wherein providing a plurality of power devices comprises providing a plurality of devices comprising at least one of a wind turbine, a photovoltaic cell, a gas turbine, or a steam turbine.

3. The method of claim 1, wherein identifying a disturbance within the plurality of power devices comprises identifying an open circuit breaker within the plurality of power devices, and further comprising:

identifying at least one of the plurality of power devices that is associated with the open circuit breaker.

4. The method of claim 1, wherein determining an impact of the identified disturbance on the plurality of power lines comprises determining whether a power signal transmitted in at least one power line of the plurality of power lines exceeds a power capacity of the at least one power line.

5. The method of claim 4, wherein adjusting a power output of one or more of the plurality of power devices comprises reducing a power output of at least one of the plurality of power devices that provides power to the at least one power line.

6. The method of claim 5, further comprising:
increasing a power output of another of the plurality of power devices.

7. The method of claim 1, wherein the plurality of power devices comprises a first plurality of power devices, and further comprising:
adjusting the power output of one or more of a second plurality of power devices based at least in part on the determined potential impact.

8. A system for monitoring power devices, the system comprising:
a plurality of power devices;
a plurality of power lines that connect the plurality of power devices in a loop to a power grid line; and
at least one controller operable to (i) identify a disturbance within the plurality of power devices, (ii) determine an impact of the identified disturbance on the plurality of power lines, and (iii) adjust, based at least in part on the determined impact, a power output of one or more of the plurality of power devices.

9. The system of claim 8, wherein the plurality of power devices comprises at least one of a wind turbine, a photovoltaic cell, a gas turbine, or a steam turbine.

10. The system of claim 8, wherein the at least one controller is operable to identify a disturbance by identifying an open circuit breaker within the plurality of power devices, and is further operable to identify at least one of the plurality of power devices that is associated with the open circuit breaker.

11. The system of claim 8, wherein the at least one controller is operable to determine an impact of the identified disturbance on the plurality of power lines by determining whether a power signal transmitted in at least one power line of the plurality of power lines exceeds a power capacity of the at least one power line.

12. The system of claim 11, wherein the at least one controller is operable to adjust a power output of one or more of the plurality of power devices by reducing a power output of at least one of the plurality of power devices that provides power to the at least one power line.

13. The system of claim 12, wherein the at least one controller is further operable to increase a power output of another of the plurality of power devices.

14. The system of claim 8, wherein the plurality of power devices comprises a first plurality of power devices and wherein the loop comprises a first loop, and further comprising:
a second plurality of power devices that are connected in a second loop to the power grid Line,
wherein the at least one controller is further operable to adjust the power output of one or more of the second plurality of power devices based at least in part on the determined potential impact.

15. A system for monitoring a power device, the system comprising:
a power device;
one or more connections operable to connect the power device to a loop, wherein the loop comprises a plurality of power lines operable to connect a plurality of power devices, including the power device, to a main power line;
at least one circuit breaker operable to control the transmission of power through the one or more connections; and
at least one controller operable to (i) identify an open condition within the at least one circuit breaker, (ii) determine an impact of the identified condition on the plurality of power lines, and (iii) adjust, based at least in part on the determined impact, a power output of the power device.

16. The system of claim 15, wherein the power device comprises one of a turbine, a photovoltaic cell, a photovoltaic array, a gas turbine, or a steam turbine.

17. The system of claim 15, wherein the at least one controller is operable to determine an impact of the identified disturbance by determining whether the power signal transmitted in at least one power line of the plurality of power lines exceeds a power capacity of the at least one power line.

18. The system of claim 15, wherein the at least one controller is operable to adjust the power output of the power device based at least in part on the power capacity of the at least one power line.

19. The system of claim 15, wherein the at least one controller is further operable to transmit a communication associated with the identified condition to at least one other power device included in the plurality of power devices.

20. The system of claim 15, wherein the at least one controller is further operable to direct, based at least in part on the determined impact, a power output of at least one other power device included in the plurality of power devices.

* * * * *